July 15, 1941.  J. L. FERGUSON  2,249,201
CASE LOADER
Original Filed May 3, 1937    13 Sheets-Sheet 1

Inventor
John L. Ferguson
BY Thiess, Olson & Mechlenburger,
Attorneys.

July 15, 1941.　　J. L. FERGUSON　　2,249,201
CASE LOADER
Original Filed May 3, 1937　　13 Sheets-Sheet 2
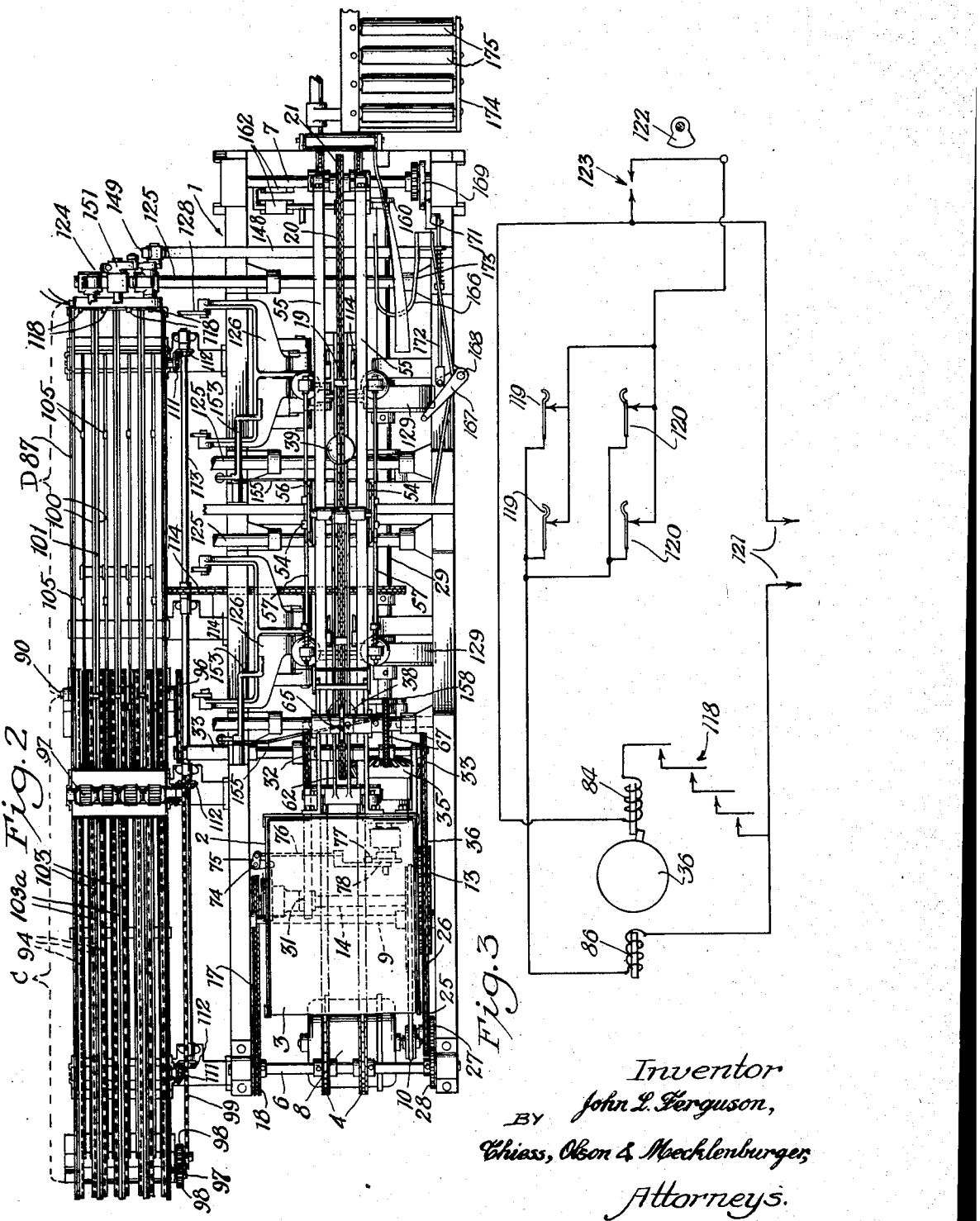
Inventor
John L. Ferguson,
BY
Chiess, Olson & Mecklenburger,
Attorneys.

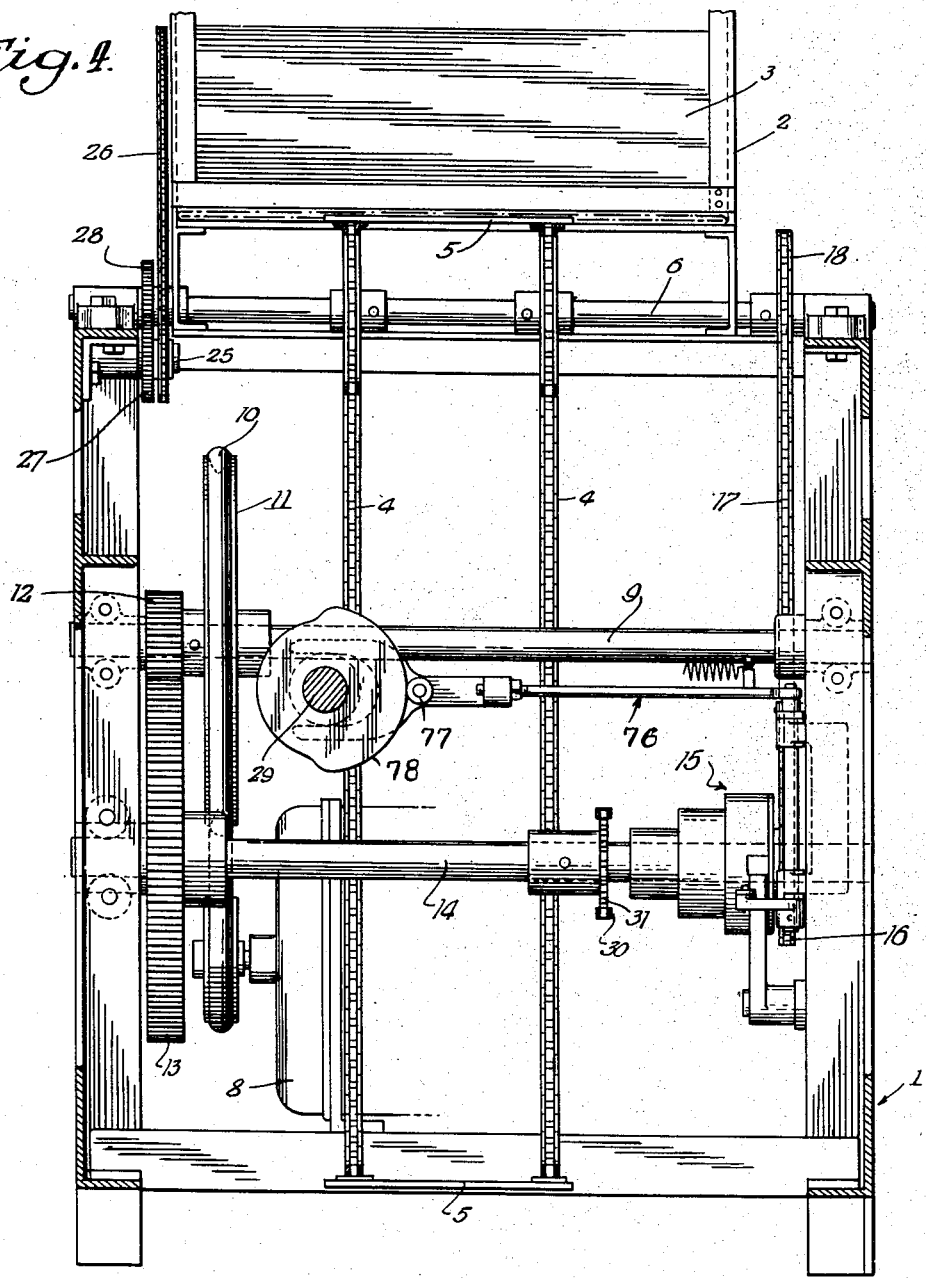

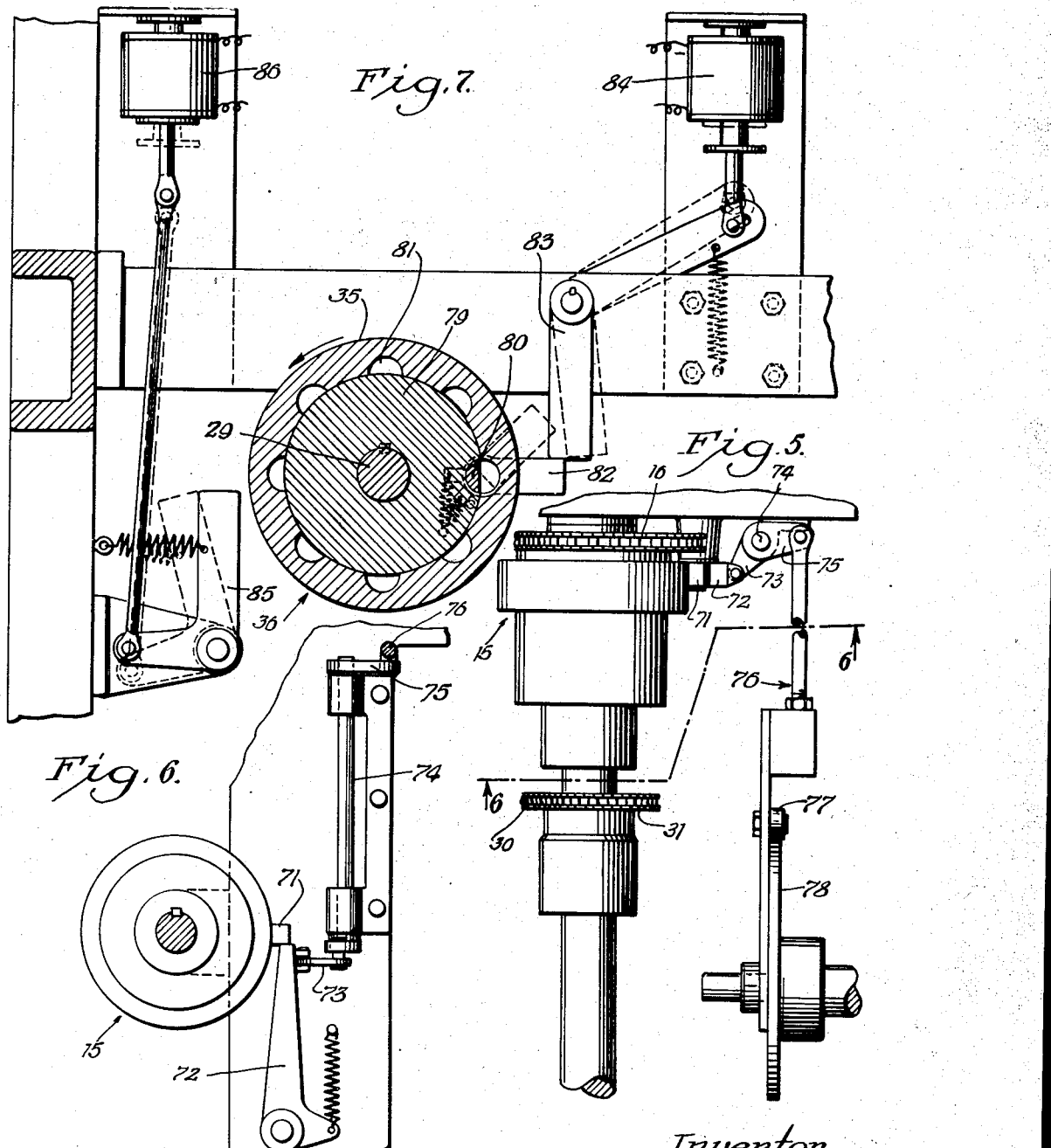

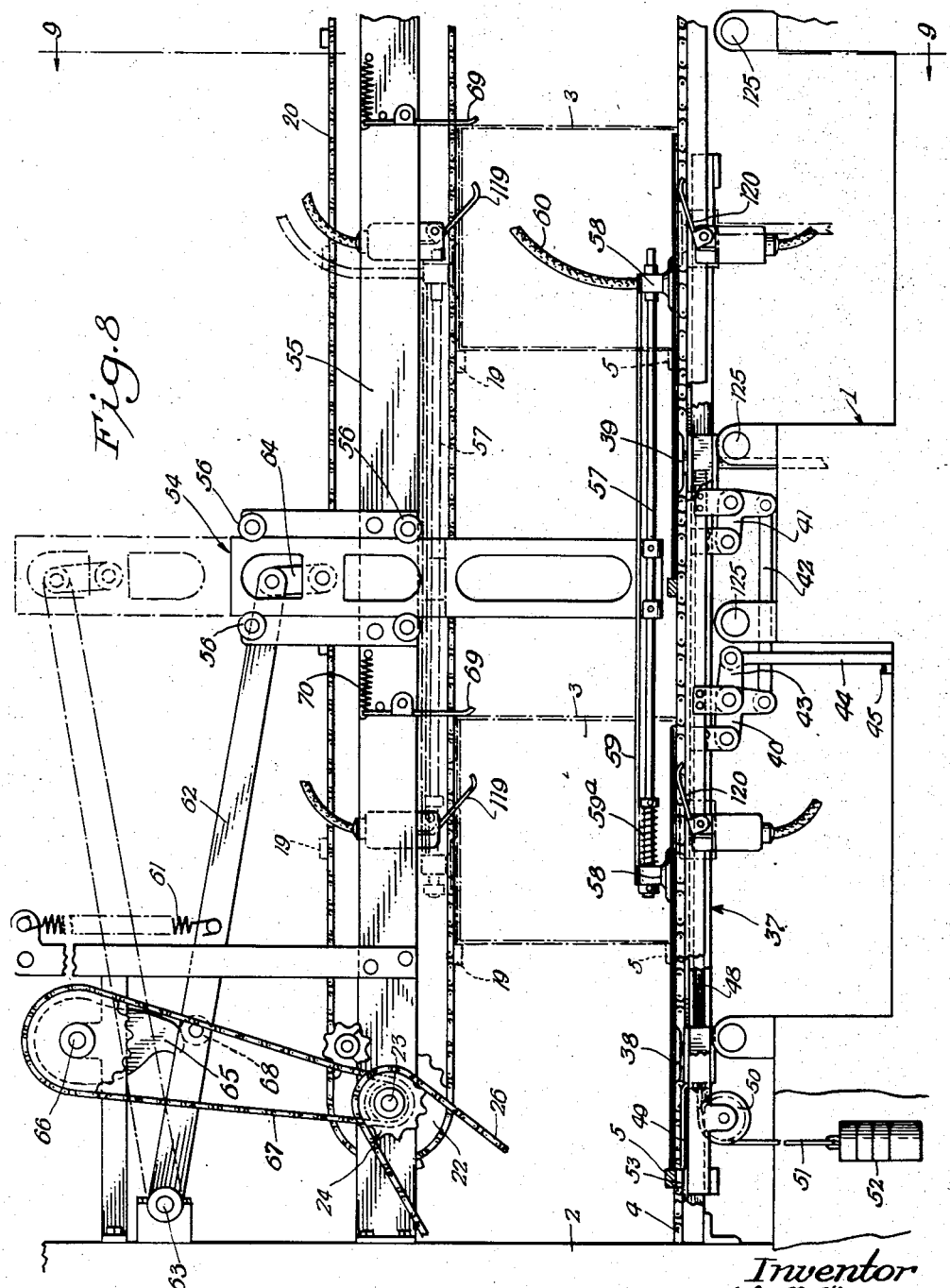

July 15, 1941.  J. L. FERGUSON  2,249,201
CASE LOADER
Original Filed May 3, 1937  13 Sheets-Sheet 6
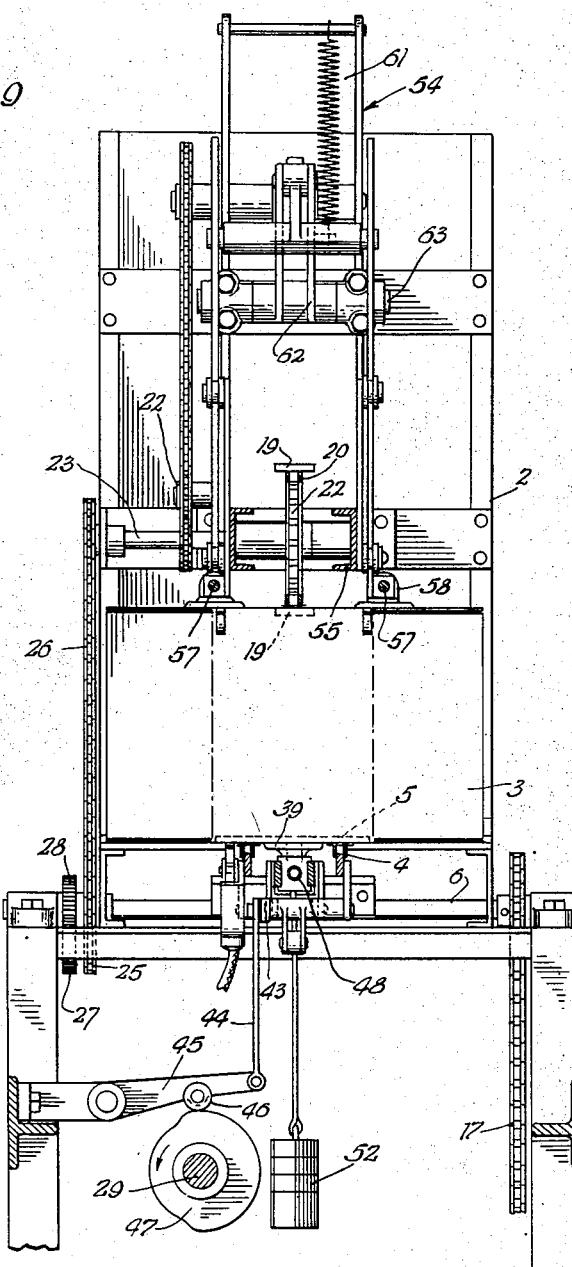
Fig. 9
Fig. 10
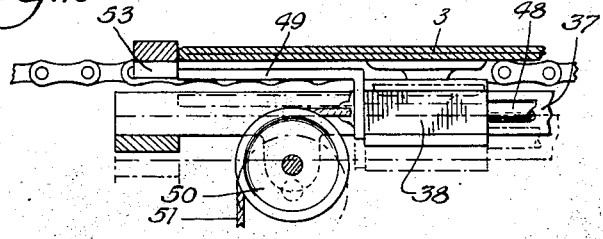
Inventor
John L. Ferguson,
BY
Chiess, Olson & Mecklenburger
Attorneys

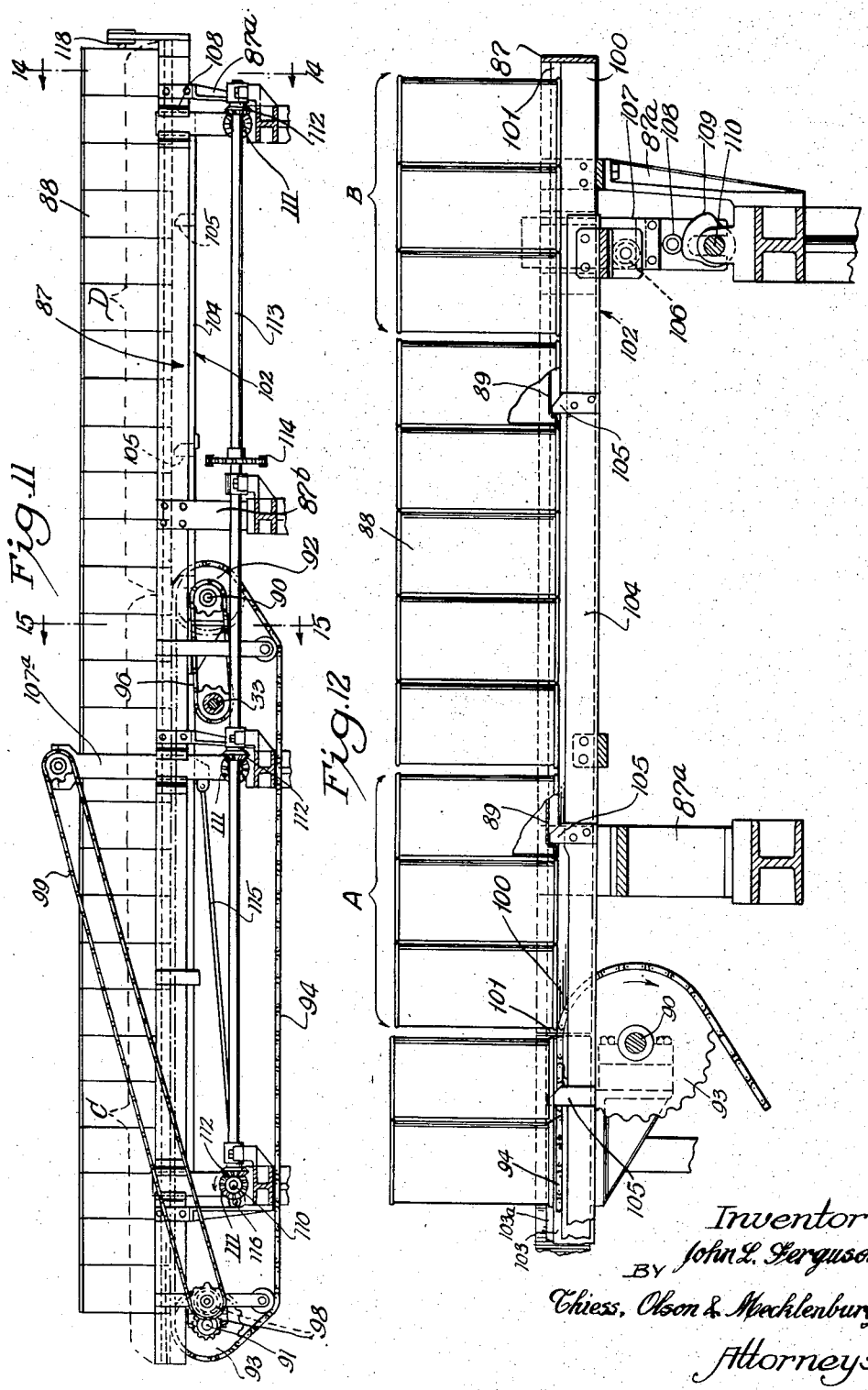

July 15, 1941.  J. L. FERGUSON  2,249,201
CASE LOADER
Original Filed May 3, 1937   13 Sheets-Sheet 8
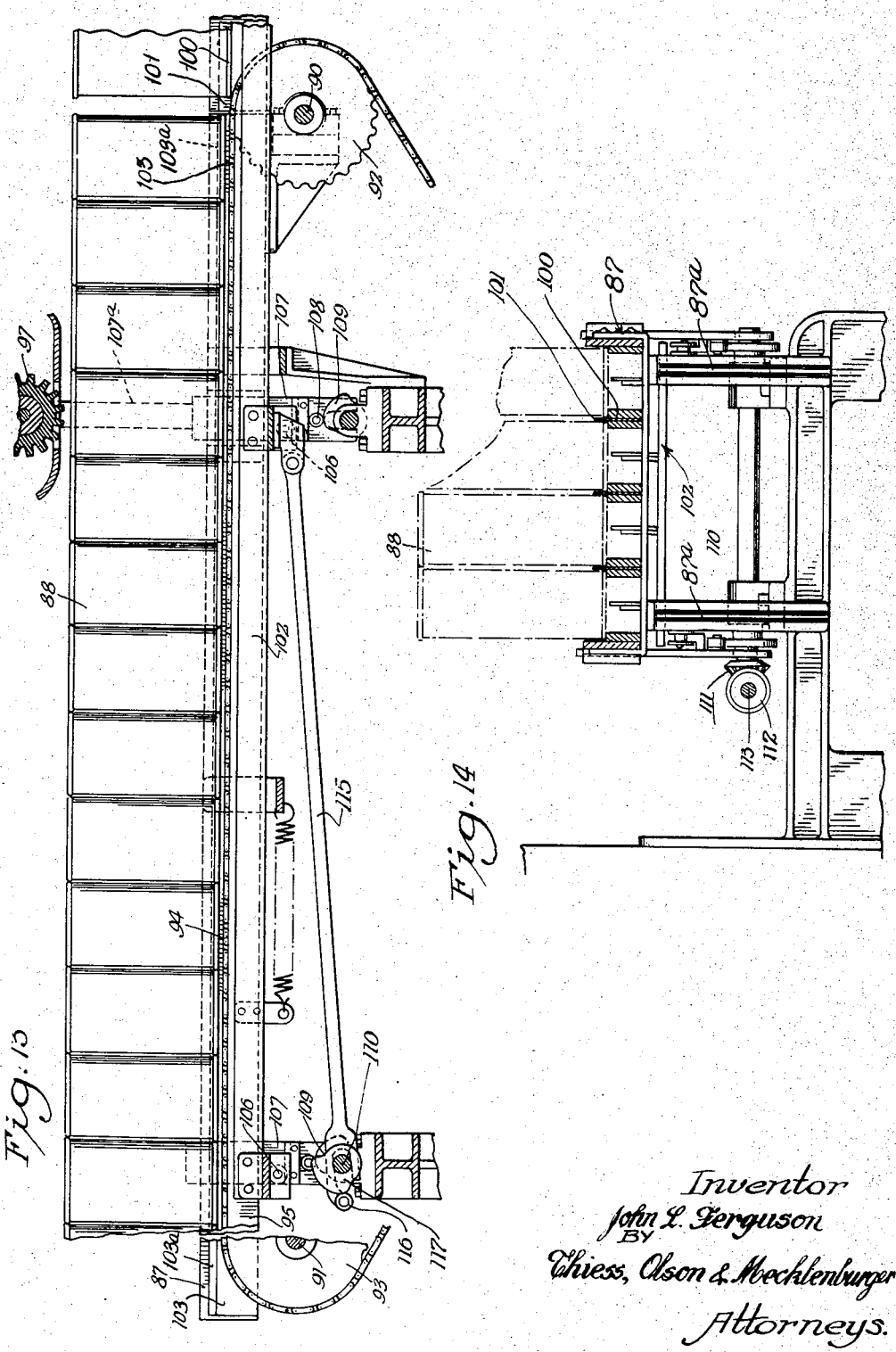
Inventor
John L. Ferguson
BY
Thiess, Olson & Mechlenburger
Attorneys.

July 15, 1941.　　J. L. FERGUSON　　2,249,201
CASE LOADER
Original Filed May 3, 1937　　13 Sheets-Sheet 9

Inventor
John L. Ferguson,
BY
Chiess, Olson & Mechlenburg,
Attorneys.

July 15, 1941.  J. L. FERGUSON  2,249,201
CASE LOADER
Original Filed May 3, 1937  13 Sheets-Sheet 13
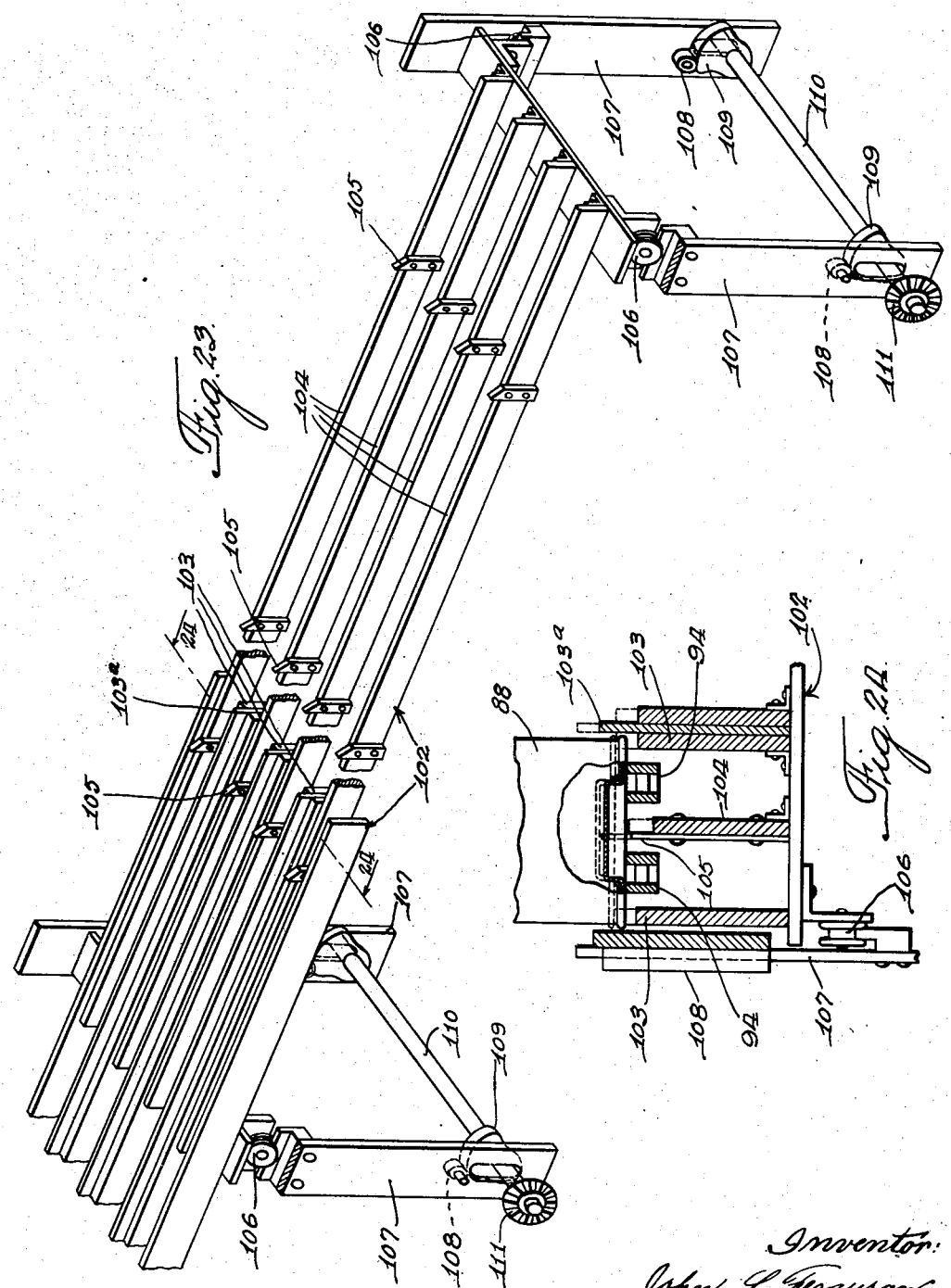

Patented July 15, 1941

2,249,201

UNITED STATES PATENT OFFICE 2,249,201

CASE LOADER

John L. Ferguson, Joliet, Ill., assignor to J. L. Ferguson Company, Joliet, Ill., a corporation of Illinois Original application May 3, 1937, Serial No. 140,467. Divided and this application May 24, 1940, Serial No. 336,925

9 Claims. (Cl. 93—53)

This invention relates to case-loading machines, and more particularly to machines arranged to receive containers on a suitable conveyor forming a part of the machine, and automatically segregate a plurality of groups of containers and insert each group simultaneously into a squared out case at a corresponding loading station.

The present application is a division of an application Serial No. 140,467, filed May 3, 1937.

The present invention contemplates an automatic machine having a plurality of case-loading stations or zones to each of which a collapsed case is moved from a supply, and at which zones each case is squared out in a manner to receive a group of containers therein, each group preferably forming a complete layer. In the present embodiment, each group completely fills the case into which it is inserted.

The embodiment herein illustrated and described comprises a magazine for holding a supply of collapsed cases, and a horizontal container positioned under the magazine is intermittently moved to remove two collapsed cases from the magazine and move them to corresponding spaced loading zones. At these loading zones, automatically operated vacuum cups are arranged to simultaneously engage the top and bottom of the collapsed containers, and the top vacuum cups, after engagement, move upwardly at a speed varying in accordance with the forward movement of the bottom of the case so that each case is squared out transversely of the machine at its respective loading zone, at which time the conveyor is automatically stopped to enable loading of the containers into the cases.

When the cases are completely squared out the upper corners are engaged by a suitable conveyor which cooperates with the lower conveyor to continue the movement and discharge of the cases from the machine after they are loaded with containers.

The containers are fed to loading position by means of a suitable conveyor located on one side of the machine and parallel with the case conveyor. In the present embodiment, this container conveyor moves four rows of closely adjacent containers to a loading position. A series of electrical switches is provided adjacent the ends of the rows and these switches are in series in a controlling circuit which, when the switches are all closed, causes the operation of the loading devices to move a group of containers into each squared out case. The pressure of the can in each row, when the row is filled, closes its corresponding switch so that when all of the rows are filled the loading operation is automatically started.

The operation of the container conveyor is continuous. However, as soon as the switches are closed to start the loading operation, the containers are lifted slightly from the conveyor chains and a rearward movement of lugs engaging the containers segregates a group of containers in the vertical plane of each loading device.

The machine is provided with a single longitudinal cam shaft, the operation of which is controlled by the closing of the container switches previously mentioned. These switches, when closed, energize a solenoid which permits the engagement of a clutch between the cam shaft and the main driving transmission, and the cam shaft then completes one revolution after which the clutch is again disengaged to permit new groups of containers to be assembled at the loading zone. Transverse plungers are operated during each rotation of the cam shaft and these plungers are provided with heads having a plurality of automatically operated vacuum cups thereon, and the plungers are normally positioned above the container conveyor so that groups of containers may be assembled thereunder. During the rotation of the cam shaft the vacuum cup heads move downwardly, each vacuum cup engages one of the containers, and the vacuum heads are then moved 90° to bring the containers into alignment with the squared out cases. The plungers then move forwardly to move each entire group into its associated case.

During the movement of the containers into alignment with the case, a flap opener automatically operates to move the bottom flap of the case downwardly to provide clearance for the containers which are moving upwardly into alignment with the case.

Provision is also made for automatically stopping the operation of the machine if one or more of the cases fails to properly open or if a case is not moved to loading position. This comprises normally closed electrical switches arranged to open a control circuit if the case is properly squared out in each zone. After the switches controlled by the containers are closed and the clutch is thereby engaged to cause a rotation of the cam shaft, the raising of the containers will release these switches and break the circuit before the containers are moved sufficiently to be inserted into a case. However, during this raising movement the case conveyor operates to discharge filled cases from the machine and to square out cases in the loading zones, and if a case fails to be properly positioned so as to close the case switches, the machine will immediately stop. This stopping is controlled by means of a timer cam which is operated from the main cam shaft and closes a circuit in series with each of the case switches. If one or more of these switches is closed by reason of a case failing to be in proper loading position, a second solenoid is operated through the circuit controlled by the timer switch cam, and the closed case switch, and this solenoid causes the disengagement of the cam shaft clutch after one-half revolution, so that the plungers do not complete their loading operation.

It is an object of the present invention to provide a machine of the character described which will be completely automatic in operation and may be operated at comparatively high speed.

A further object is the provision of a new and novel type of container conveyor and grouping mechanism which may be operated at comparatively high speed, and by which groups of containers may be accurately segregated and positioned at the desired loading zone.

It is a further object to provide a machine of the character described in which the loading operation is controlled by the proper assembly of containers at the loading zone.

Another object is the provision of a new and novel type of squaring out mechanism in which the squaring out may be accomplished substantially entirely by the use of vacuum means in connection with a moving conveyor for moving the collapsed cases to their respective loading zones.

Further objects will be apparent from the specification and the appended claims.

In the drawings:

Fig. 2 is a top plan view of the embodiment illustrated in Fig. 1 with the loading plungers and supports therefor broken away to better illustrate the container conveyor and grouping mechanism.

Fig. 3 is a diagram of the electrical control whereby the loading operation may be controlled by the containers and squared out cases.

Fig. 4 is a transverse sectional view taken on a line substantially corresponding to line 4—4 of Fig. 1 and illustrates the driving mechanism and clutch control for the case conveyor.

Fig. 5 is a top plan view of the clutch control mechanism for controlling the case conveyor.

Fig. 6 is a side elevation of the clutch control mechanism illustrated in Fig. 5 with the clutch shaft and control link shown in section and taken on a line substantially corresponding to line 6—6 of Fig. 5.

Fig. 7 is a transverse sectional view through the main cam shaft clutch and illustrates the electrical control therefor.

Fig. 8 is an enlarged side elevation of the case squaring out mechanism illustrated in Fig. 1.

Fig. 9 is a transverse sectional view taken on a line substantially corresponding to line 9—9 of Fig. 8 and illustrates the squaring out mechanism and the position of the squaring out vacuum cups and particularly the method of operating the lower vacuum cups from the main cam shaft.

Fig. 10 is a side elevation of the lower vacuum cup controlling means and illustrates the means for preventing tilting of the rubber vacuum cup by the collapsed case as it is being moved to the squared out position by the conveyor, the conveyor flight and collapsed case being shown in sections.

Fig. 11 is a side elevation of the container conveyor and operating mechanism therefor with the driving connections leading to the main cam shaft being shown in section.

Fig. 12 is a longitudinal section of the group-assembling end of the container conveyor illustrated in Fig. 11 and illustrates the position of the group segregating means after the containers have been moved rearwardly to segregate the groups to be loaded.

Fig. 13 is a similar longitudinal section of the chain conveyor end of the conveyor illustrated in Fig. 11, and illustrates the mechanism for moving the container supporting racks and for raising the containers from the conveyor chains.

Fig. 14 is a transverse sectional view through the container conveyor frame and taken on a line substantially corresponding to line 14—14 of Fig. 11.

Fig. 23 is a perspective view of the vertically and longitudinally movable rack for raising the containers from the conveyor chains by vertical movement, and for segregating the groups of containers by longitudinal movement of the rack.

Fig. 24 is a fragmentary cross sectional view through the rack and taken on a line substantially corresponding to line 24—24 of Fig. 23.

Figure 1:
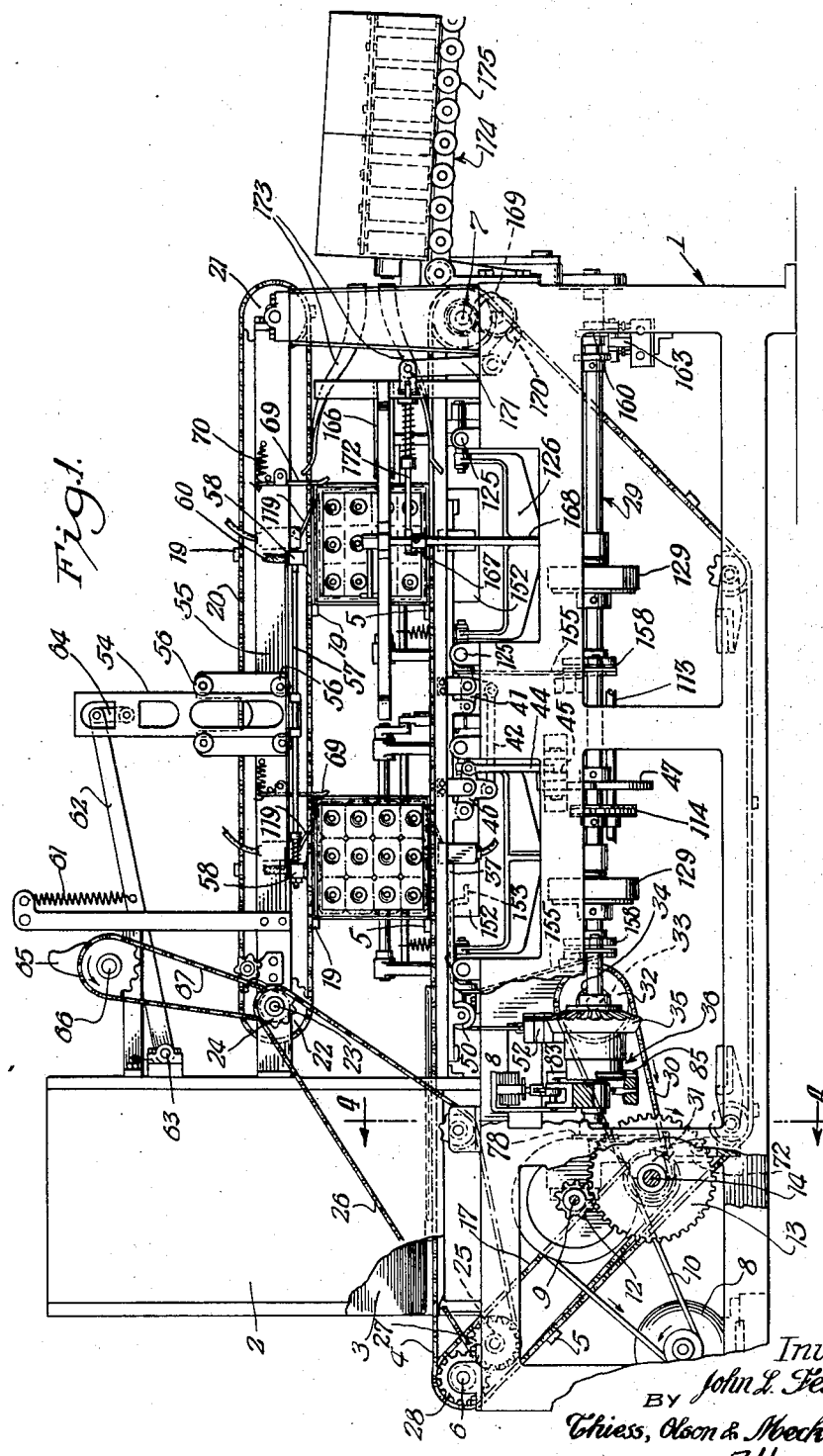
Fig. 1 is a side elevation of one embodiment of the invention, parts being broken away for purposes of illustration.

Referring to the drawings in detail, the embodiment illustrated comprises a frame 1, on which substantially the entire mechanism is supported. A magazine 2 is supported adjacent one end of the machine and arranged to receive a supply of collapsed cases 3. An intermittently movable longitudinal conveyor, comprising chains 4, having spaced case-engaging flights 5, extends under the magazine, and the collapsed cases rest thereon. These flights are so spaced on the conveyor chains 4 that the intermittent movement of the conveyor will cause them to move two cases from the magazine and correctly position each consecutive case for the loading operation and for other operations connected with the proper functioning of the machine.

The chains 4 are mounted on suitable sprockets secured to transverse shafts 6 and 7, rotatably mounted in suitable bearings at the front and rear of the machine respectively. A motor 8 is mounted on the frame as illustrated, and a suitable transmission is provided between the motor and the case conveyor 4 whereby the conveyor may be intermittently operated, although the operation of the motor may be continuous.

The conveyor transmission comprises a transverse shaft 9 which is driven from the motor by means of a belt 10 and pulley 11, the latter secured to the shaft. A pinion 12 is also secured to the shaft and is in mesh with a gear 13 secured to a second transverse shaft 14. This shaft 14 is provided with a clutch 15 which is normally disengaged and which is arranged when engaged to drive a sprocket 16 which is loosely mounted on the shaft and comprises the driven member of the clutch. A chain 17 connects the sprocket 16 with a suitable sprocket 18 on the conveyor shaft 6. It will therefore be apparent that when the clutch 15 is engaged, the conveyor 4 will be operated to move a plurality of cases from the magazine to their respective loading positions.

The engagement and disengagement of the clutch is automatically controlled by a main cam shaft which is in turn controlled by the proper assembling of the containers to be loaded. The control will be described in detail later.

When the cases are moved by the conveyor 4 to the loading stations and squared out by means of a suitable mechanism, the rear top corner of each container is engaged by a flight 19 on a suitable longitudinal conveyor chain 20 positioned above the loading stations and supported on an idler sprocket 21 at the discharge end of the machine, and a sprocket 22 secured to a stub shaft 23. The shaft 23 is also provided with a sprocket 24 which is driven from a sprocket 25 by means of a chain 26. The sprocket 25 is secured to a gear 27 which latter is in mesh with a similar gear 28 on the main conveyor drive shaft 6. The conveyor 20, therefore, operates in synchronism with the conveyor 4 to engage the squared out cases and to thereafter cooperate with the conveyor 4 in discharging the loaded cases from the machine.

In order to operate the various mechanisms automatically a main longitudinal cam shaft 29 is mounted in suitable bearings on the frame 1. This cam shaft is driven from the transverse shaft 14 by means of a chain 30 on the shaft 14 (Fig. 1) and sprockets 31 and 32 on the cam shaft 14 and on a transverse shaft 33 respectively. The transverse shaft 33 is also provided with a beveled pinion 34 meshing with a beveled gear 35 on the cam chaft 29. The beveled gear 35 is loosely mounted on the cam shaft and forms the driving member of a clutch 36, the driven member of which is rigidly secured to the cam shaft. It will, therefore, be apparent that when the clutch 36 is engaged, the cam shaft will be driven through the transmission just described.

As previously mentioned, the machine is automatically controlled by the proper assembling of the containers which are to be loaded in the cases and, when these containers are properly positioned, the clutch 36 will be engaged and permit one revolution of the cam shaft 29 to complete the loading operation.

The mechanism for squaring out the cases is illustrated particularly in Figs. 1, 2, 8, 9, and 10 and comprises a horizontal frame or track 37 on which is slidably mounted a vacuum cup 38 for the cases to be squared out of the first loading station, and a second vacuum cup 39 for the cases to be squared out at the second loading station. The horizontal frame 37 is supported as illustrated in Fig. 8 on suitable bell cranks 40 and 41, which are connected together by means of a link 42. The bell crank 40 is provided with an arm 43 having a link 44 secured thereto. The opposite end of this link 44 is secured to a cam lever 45 (Fig. 9) having a roller 46 thereon engaging a cam 47 on the main cam shaft 29. It will, therefore, be seen that, with each revolution of the cam shaft, the frame or track and the vacuum cups thereon will be raised and the cups will contact with the lower surfaces of the collapsed case while the cases are being moved into the loading zones.

The vacuum cups 38 and 39 are slidably mounted on the frame 37 and are connected together by a suitable hollow rod or conduit 48, which conduit may be connected by means of a flexible hose to a suitable vacuum source. The first vacuum cup adjacent the magazine is illustrated particularly in Fig. 10 and is provided with a rearwardly extending bar 49. A pulley 50 is mounted on the frame 37, and a cable 51 is secured to the vacuum cup member and provided with a weight 52 so that, when the vacuum is released from the cups after they have traveled forwardly to square out the case, the weight will cause the vacuum cups to be moved rearwardly to their normal position and against a suitable stop.

As previously stated, the vacuum cup member 38 is provided with a rearwardly extending arm 49, and, when the vacuum cups are raised to the position shown in Figs. 9 and 10, the arm 49 is in the path of a downwardly extending lug 53 on the flight 5 of the conveyor chain, each of the flights 5 being provided with one of the lugs 53. This lug engaging the arm 49 assists in pushing the vacuum cups along with the collapsed cases until they are squared out, and prevents the vacuum cups from being tilted by the rearward pressure caused by the weight 52, and therefore prevents the pulling loose of the vacuum cups from the cases before the cases are completely squared out. As soon as the cases are completely squared out at the loading stations the vacuum is released and the cam 47 (Fig. 9) permits the cups and associated arm 49 to move downwardly out of the path of the conveyor flights. The weight 52 then moves the cups to their normal position.

When the collapsed cases 35 are engaged by the lower cups 38 and 39, the top walls of the cases are substantially simultaneously engaged by a set of upper vacuum cups which are vertically movable downwardly to engage the cases and then move upwardly to move the top walls of the cases into the squared out position. This upper squaring out mechanism comprises a vertically reciprocable frame 54 which is normally in the raised position illustrated in Figs. 1 and 9 and may be moved downwardly as shown in Fig. 8. This frame is supported on the upper longitudinal framework 55 of the machine on which is supported a plurality of rollers 56 in which the frame is supported and which act as guides for the frame.

As illustrated more clearly in Fig. 8, the frame 54 is provided at its lower end with horizontal bars 57 having adjacent each end thereof a vacuum cup 58, each of which is arranged to engage a collapsed case at its associated squared out station when the frame is moved downwardly. The vacuum cups 58 are connected together by means of a rigid vacuum conduit 59 and are slidably mounted on the rod 57 and normally held in the left hand position illustrated by means of a spring 59a. The spring is for the purpose of enabling a sliding movement of the vacuum cups on the rod in case of slight variations in the cases, or for other reasons. The rigid conduit 59 between the cups is connected to a suitable vacuum source by means of a conduit 60. It will be understood that the application of vacuum to the various vacuum cups of the machine is controlled and timed by a suitable valve mechanism, which will be described later.

As will be apparent from Fig. 9, the vacuum cups 58 are in transverse pairs, each pair arranged to engage an associated case to be opened. The bottom vacuum cups 38 and 39 are located on the central plane of the case, and only one lower cup is used for each case. The vacuum cup frame 54 is normally retained in its raised position by means of a spring 61 connected to a lever 62, which lever is pivoted at 63 and connected to the frame by means of a link 64. A cam 65 is secured to a stub shaft 66 and is driven from the upper conveyor shaft 23 by means of a chain 67 on suitable sprockets. This cam engages a roller 68 on the lever 62. It will, therefore, be apparent that, during the movement of each pair of collapsed cases to the loading station, the lower vacuum cups will engage the lower walls of the collapsed cases while the upper vacuum cups will move downwardly and engage the upper walls. The lower cups will then move with the cases toward the squaring out position, while the upper cups will raise the upper wall of each case into engagement with the flights on the upper conveyor chain 20. The conveyor is automatically stopped when the cases are properly squared out.

It will be noted that, while the lower vacuum cups and lower walls of the cases move at a uniform rate, the movement of the upper cups must necessarily substantially uniformly accelerate during the raising movement in order that the upper wall of the case may move vertically at the squaring out station while the lower wall is moved horizontally to the squared out position. This acceleration is accomplished by means of a proper shaping of the cam 65, which permits the spring 61 to cause an accelerating upward movement of the upper vacuum cups.

When the cases are completely squared out, the upper front corner of each case is engaged by a latch 69 pivoted to the frame 55, these latches being normally retained in the position illustrated by means of springs 70. The resilient latches assist in retaining the cases in squared out position and are sufficiently yieldable to allow the cases to be moved from the loading position during the next operation of the machine.

Fig. 5 illustrates the control means for the case conveyor clutch 15, and this clutch may be of the usual type in which a dog is provided for operating a locking pin between the driving and driven member. This dog is provided with an outwardly extending lug 71 which is normally engaged by a pawl 72 whereby the clutch is normally retained out of engagement. The pawl 72 is connected by means of a link 73 to a vertical shaft 74 having an arm 75 thereon, which arm is provided with a link 76 having a roller 77 thereon. This roller is arranged to engage a cam 78 secured to the cam shaft. This cam and roller operation is better illustrated in Fig. 4.

It will be apparent that with each revolution of the cam shaft the conveyor clutch 15 will be engaged over a predetermined portion of the revolution of the cam shaft, and the case conveyor will move sufficiently to carry two of the collapsed cases to their respective loading stations where they will be squared out by the mechanism previously described.

As previously stated, the cam shaft 29 is driven by the beveled gear 35 forming the driving member of the clutch 36, and this beveled gear is in turn driven by means of a suitable transmission from the motor. The clutch 36 and control mechanism therefor are illustrated in Fig. 7 and comprise a driven member 79 secured to the cam shaft 29 and provided with the usual clutch engaging dog 80. The beveled gear 35, which forms the driven member, is provided with a plurality of notches 81, any one of which may receive the dog 80. The dog is provided with an outwardly extending lug 82 which is normally engaged by a pawl 83 pivoted on the frame of the machine. This pawl 83 normally retains the clutch disengaged, but may be released to permit engagement by means of a solenoid 84 which, when energized, will move the pawl to the dotted line position and permit one revolution of the cam shaft. Normally, the cam shaft rotates one revolution in order to move the cases to the loading position; square out the cases; segregate groups of containers; and load these groups into the cases. However, if the cases are not properly squared out or a case is not moved to a loading position, it is desirable to stop the machine before the cam shaft has completed its revolution in order that the containers may not be moved to the loading position unless a case is properly squared out to receive them. In order to automatically stop the cam shaft after a half revolution, if the case is not properly squared out, a second pawl 85 is pivoted on the frame as illustrated, and may be controlled by means of a solenoid 86. The electrical controls of these solenoids will be described later.

The pawl 85 is normally in the dotted line position shown when the solenoid 86 is deenergized. However, if a case for any reason is not properly squared out at the loading station, the solenoid 86 will be energized and the pawl 85 will move to the full line position whereby it will engage the lug 82 of the clutch dog and stop the cam shaft after a half revolution.

The combined container conveyor and group segregating device is illustrated in detail in Figs. 11 to 17, inclusive, and comprises a rigid frame 87, which in the present embodiment is arranged to support four rows of containers 88. The present embodiment is particularly adapted for use with containers such as the ordinary cocoa cans. These containers are usually provided with a comparatively large depressed cover in one end, such as shown at 89, and the conveyor is particularly adapted to convey these cans inverted with the top down as shown, and the depression in the cover is used to receive lugs, which are raised therein in order to move the containers to segregate the groups. It will, of course, be understood that the invention is adapted for use with any type of containers having depressed ends, which are sufficiently depressed to permit lugs to be raised therein to move the containers.

Figure 15:
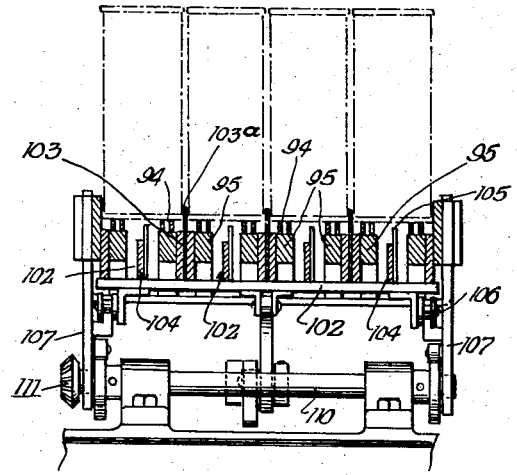
Fig. 15 is a transverse sectional view through the container conveyor and taken on a line substantially corresponding to line 15—15 of Fig. 11. This view illustrates the normal position of the parts before the containers have been raised from the chains.
Figure 16:
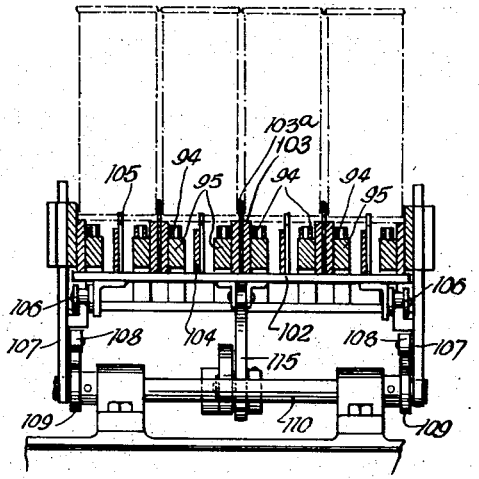
Fig. 16 is a view similar to Fig. 15, but illustrates the racks in raised position, whereby the containers are raised from the conveyor chains.
Figure 17:
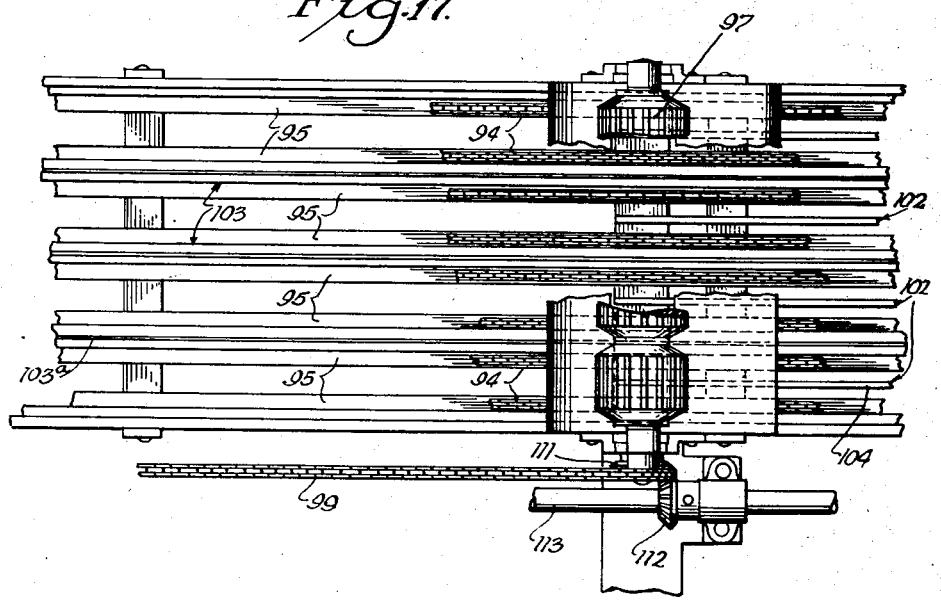
Fig. 17 is a top view and illustrates the pressure roller for contacting with the top of the containers to assist in moving them to loading position.

As previously stated, the conveyor comprises a rigid frame 87 to support the rows of containers, and this elongated frame is provided at the left hand end, as shown in Fig. 11, with transverse shafts 90 and 91 on which are secured a plurality of sprockets 92 and 93, respectively. Conveyor chains 94 are mounted on these sprockets and support the containers as illustrated in Figs. 15 and 16, and are in turn supported on fixed guides 95, forming a part of the rigid frame. The conveyors are continuously driven from the transverse shaft 33 shown in Figs. 1 and 2. A chain drive is provided from the shaft 33 to the conveyor shaft 90 by means of suitable sprockets and a chain 96. The right hand end of the conveyor frame (Figs. 11 and 12) extends for some distance beyond the conveyor chains 94, and the containers are pushed onto this extension by means of the conveyor chains 94 and a transverse roller 97 which is positioned above the containers. This roller 97 is preferably of resilient material such as rubber and is continuously driven by means of a transmission from the conveyor shaft 91. This transmission comprises gears 98 and suitable sprockets on which is supported a chain 99.

The roller 97 is normally in a position to exert a downward pressure on the tops of the conveyors and assist the chains in assembling the four rows of containers onto the forward extending support.

The container assembling device as illustrated may be described as comprising two zones as shown by the dotted line brackets C and D, respectively (Figs. 2 and 11), zone C being a conveyor zone having conveyor chains supported in a fixed position on the frame of the machine; that is, the conveyors are not bodily movable. These chains normally support the containers and convey them toward the grouping zone D. As the containers move from the conveyor chains they are pushed, by the succeeding chambers, onto fixed supports and between guides forming a stationary part of the frame of the machine in zone D whereby the grouping zone D is filled with closely adjacent containers as shown in Fig. 11.

It is desirable to segregate two groups of containers in zone D so that these groups may easily be moved out of the grouping zone by the loading mechanism and then into the adjacent squared-out cases. The segregated groups are indicated by the full line brackets A and B in Fig. 12. At the same time it is desirable to raise all of the containers remaining in zone C from the conveyor chains on which they are supported so that all of the containers except those in group B (Fig. 12) may easily be moved rearwardly, that is, to the left, as shown in Figs. 11 and 12, to segregate the groups and to prevent friction of the chains on the containers.

In order to segregate the groups and substantially simultaneously raise the containers in zone C from the chains, an elongated skeleton frame or rack (Fig. 23) is positioned under the containers in zones C and D and is arranged to be moved vertically to raise the containers in zone C from the conveyor chains, and is then moved longitudinally to segregate the groups A and B.

In other words, the containers in zone C are normally supported on the conveyor chains and in zone D they are always supported on fixed guide members on the frame of the machine. When the movable rack (Fig. 23) is raised, the containers in zone C are thereby raised from the conveyor chains, while the containers in zone D are not raised but remain resting on, and supported by, the fixed guide members on the frame of the machine.

The movable rack is provided with upwardly extending spaced lugs which, when the frame is raised, extend into the depressions 89 in the container covers or otherwise engage predetermined containers so that when the skeleton rack is then moved longitudinally the groups will be segregated. As soon as the groups are removed by the loading mechanism for insertion in the cases, the rack is returned to its normal position and the conveyor chains again move containers from zone C onto the fixed supports in zone D.

The rigid frame 87 is provided, in the segregating zone D, with fixed container-supports 100 (Fig. 14) having upwardly extending thin flanges 101, which latter extend upwardly between the rows of containers and maintain the containers in alignment when they are pushed from the conveyor chains and onto the fixed supports in zone D. The frame 87, including the container supports 100 and aligning flanges 101, may rigidly be supported on the frame of the machine by means of brackets 87a and 87b (Figs. 11, 12, and 14). The break between the fixed members 100 and 101 and the rack members 103 and 103a is shown at the right end of Fig. 13 and adjacent the left end of Fig. 12.

A vertically and longitudinally movable frame or rack 102 is positioned below the containers provided with longitudinal bars 103 (Figs. 15, 16, and 23) forming supports for the containers in zone C only when the rack is raised. These supports have container spacing and aligning flanges 103a associated therewith. The supports 103 are normally below the plane of the conveyor chains when the rack is in its lowered position and raises all of the containers in zone C from the chains when the rack is raised.

The rack is also provided with longitudinal bars 104 extending under the containers in the grouping zone D and having upwardly extending lugs 105 thereon, these lugs normally being below the containers as shown in Figs. 11 and 24 and extending into the depressed covers 89 of the containers only when the rack is raised. This rack is arranged to automatically be moved upwardly and then longitudinally when the grouping zone is filled with containers, and the lugs 105 enter the depressions in the covers of predetermined containers, as illustrated in Fig. 12, and move them to the left, and thereby separate the containers into groups A and B, which groups may then be removed by the loading mechanism and inserted into the squared out cases. The rack is then lowered to deposit the containers in zone C onto the conveyor chains whereby zone D will again be filled. The bars 104 (Fig. 24) never contact the containers and the lugs 105 do not raise them.

The rack is provided with rollers 106 which support the rack for longitudinal movement on suitable tracks forming a part of vertically movable slide members 107. These slide members are guided in suitable guides 108 on the rigid frame of the machine. The slide members 107 are provided with cam rollers 108, which rollers are in engagement with cams 109 on transverse shafts 110. By this arrangement the entire rack is supported on the slides for longitudinal movement and on the cams for vertical movement thereby.

The transverse shafts 110 are each provided with beveled gears 111 which mesh with beveled gears 112 on a longitudinal shaft 113 (Fig. 11). This longitudinal shaft is arranged to be driven from the main cam shaft by means of suitable sprockets and a chain 114. Therefore, it will appear that, whenever the cam shaft rotates, the transverse shafts 110 will also be rotated and the cams thereon will lift the movable rack 102, and this rack will lift the containers in zone C slightly from the chains 94 and will also raise the lugs 105 into the depressions in the covers of the containers. The containers in zone D will not be lifted. The rubber roller 97 is supported above the containers on the central slide members 107a so that this roller is raised simultaneously with the frame. It will be noted from Figs. 15 and 16 that there is considerable clearance between the normal low position of the frame and the containers on the chains so that the containers are only slightly raised above the chains, while the rubber roller is raised completely free from the tops of the containers so that the containers may easily be moved longitudinally by the group-segregating lugs 105.

As soon as the rack is raised by the cams 109, or substantially simultaneous therewith, the rack is moved to the left to cause the lugs 105 to segregate the groups A and B as illustrated in Fig. 12. This longitudinal movement is accomplished by means of the mechanism illustrated in Fig. 13, which comprises a link 115 secured to the rack member and provided, at its opposite end, with a roller 116 engaging a cam 117 on one of the transverse shafts 110. By this mechanism, whenever the cam 117 is rotated, the rack 102 will be raised and substantially simultaneously move to the left to the position illustrated in Fig. 12 to thereby segregate the two groups of containers A and B.

Fig. 24 illustrates the normal position of the parts in full lines and the approximate position after the rack has been raised is shown in dotted lines.

The right hand end of the container support as illustrated in Figs. 2 and 11 is provided with a plurality of switches 118, with one switch in alignment with each row of containers. These switches are normally open and are in series so that, when all of the rows are filled, the pressure of the containers will close all of the switches and the main cam shaft will be rotated and the filling operation accomplished.

The wiring diagram is illustrated in Fig. 3 and includes case controlled switches 119 and 120, which are normally closed and are arranged to be opened by the squared out cases when they are properly squared out at the loading stations. These switches are illustrated in Fig. 8, and it will be apparent that, when the cases are properly squared, all of these switches will be open.

The wiring diagram comprises the conductors 121 which are connected to any suitable power source, and the series switches 118 for the containers are also in series with the solenoid 84 illustrated in Fig. 7 so that, when all four rows of containers are properly assembled, the solenoid 84 will be energized and permit the engagement of the cam shaft clutch 36 in order that the cam shaft may complete a revolution and thereby load a group of containers into the cases.

Before the cam shaft has rotated one-half a revolution, the cases are completely squared out, and, in the event that any case does not properly square out and open all of the switches 119 and 120, a timer cam 122, which may also be mounted on the cam shaft, closes a switch 123, which is in series with the case switches 119 and 120. The solenoid 86 is in series with these switches and also with the switch 123, and therefore, if any one of the case switches is closed, the solenoid 86 will be operated and prevent the further operation of the cam shaft and thereby stop the loading operation.

Figure 18:
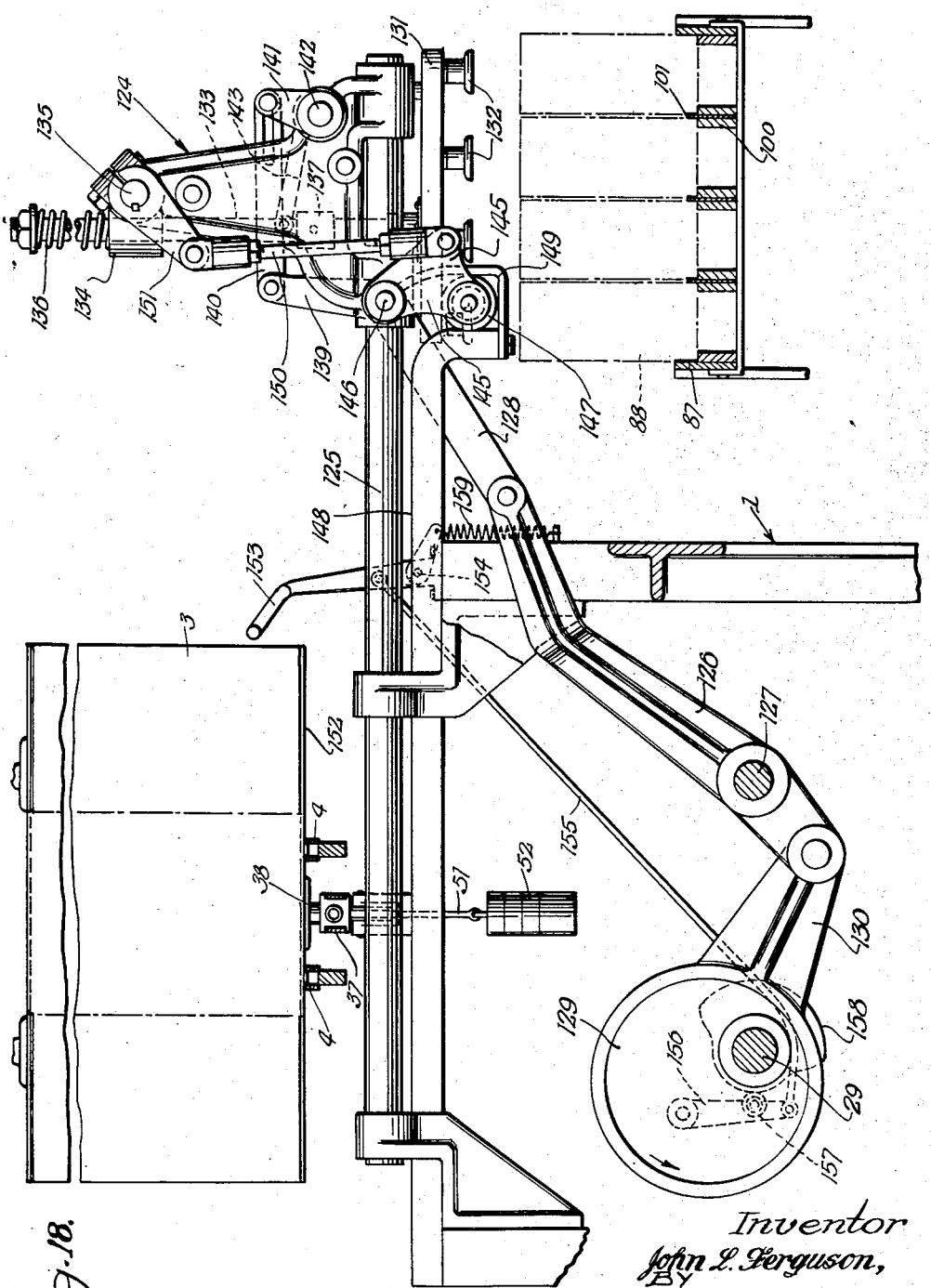
Fig. 18 is a transverse sectional view through one of the loading zones and illustrates the loading carriage and vacuum cup head in its normal stop position over the container conveyor.
Figure 19:
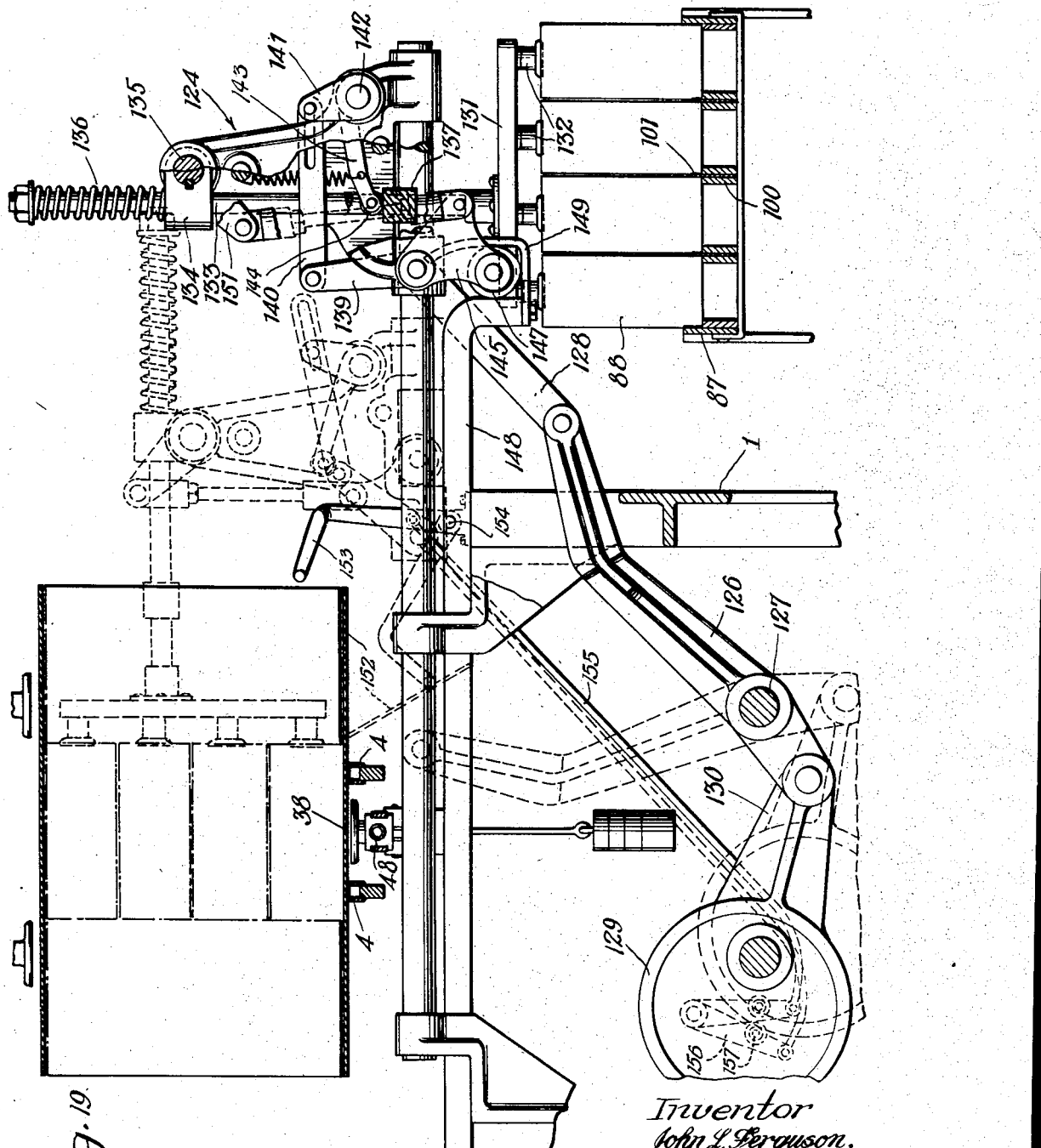
Fig. 19 is a transverse sectional view similar to that illustrated in Fig. 18, but illustrates the vacuum cup head after it has been moved downwardly to engage a group of containers, the position of the carriage and other operating parts with the containers completely inserted in the case being illustrated in dotted lines.
Figure 20:
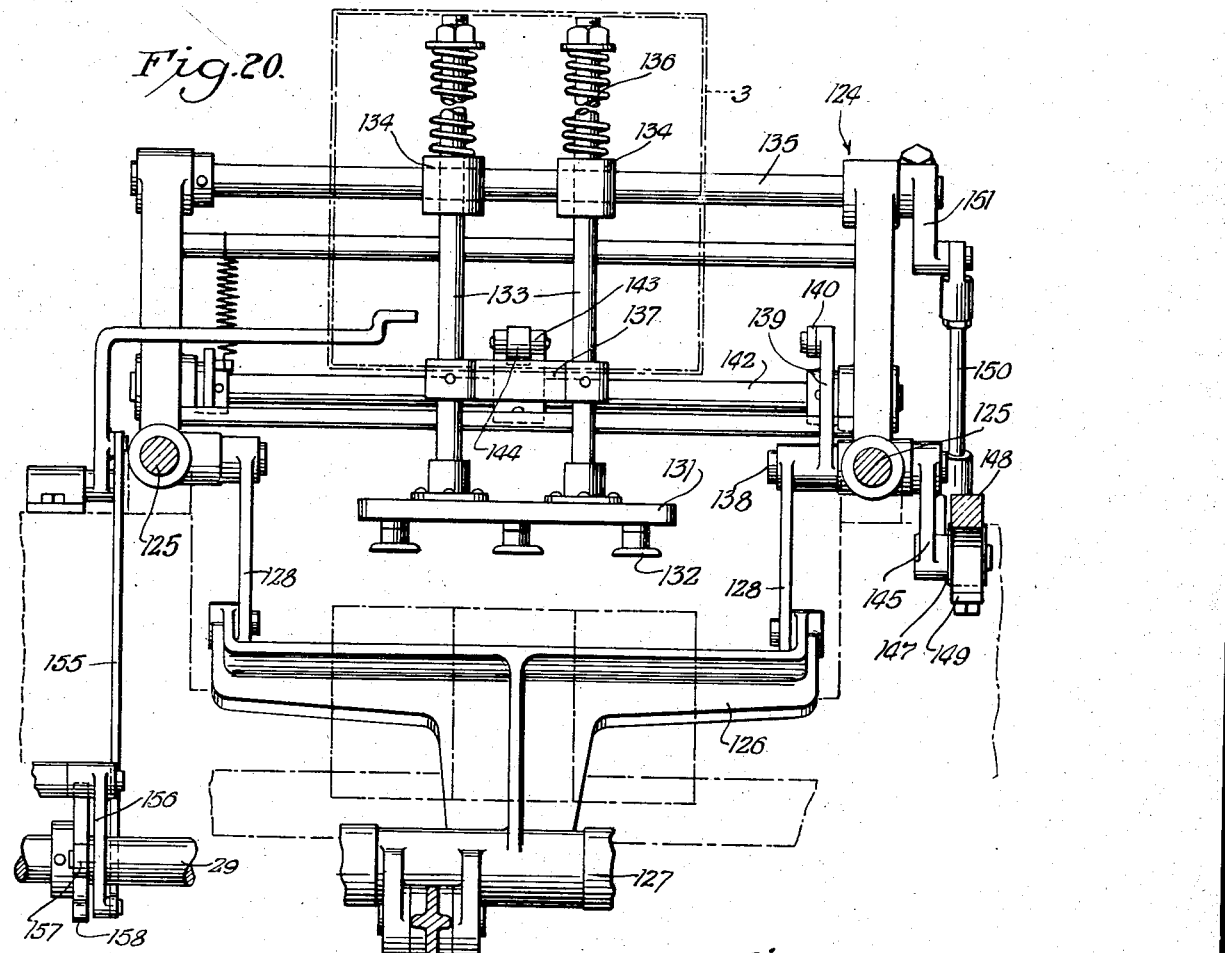
Fig. 20 is a back view of one of the container loading heads and carriage therefor.

The loading mechanism for moving the groups of containers into the cases is illustrated in Figs. 18 to 20, inclusive. Each loading mechanism comprises a carriage 124 supported for reciprocation on suitable guide rods 125, which are in turn supported on the frame 1. The carriage is reciprocated by means of a lever 126 oscillatably mounted on a shaft 127 and connected to the carriage by means of a link 128. The lever 126 is connected to an eccentric 129 on the cam shaft by means of an arm 130. It will, therefore, be seen that, with every revolution of the cam shaft 29, the carriage 124 will be reciprocated to and from the case.

The carriage is provided with a vacuum cup head 131 having vacuum cups 132 thereon, one of which engages each of the containers in its associated group when the head is moved downwardly so that the cups can contact therewith. The vacuum head 131 is supported on vertical rods 133 which are slidably mounted in brackets 134 secured to an oscillatable shaft 135. Springs 136 normally tend to retain the head in the raised position illustrated in Fig. 18.

The head is provided with a cross bar 137, and the link 128, which is pivoted on the carriage at 138, is provided with an upwardly extending arm 139, which arm is connected by means of a slotted link 140 to an upwardly extending arm 141 on an oscillatable shaft 142. This shaft 142 is provided, as shown particularly in Fig. 19, with an arm 143 secured thereto and having a roller 144 thereon, which is normally positioned above the cross bar 137, as shown by dotted lines in Fig. 18.

At the beginning of the cam shaft movement, the lever 126 for reciprocating the carriage moves slightly downward to the position indicated in Fig. 19, and this movement causes the lever 143 and roller thereon to be moved downwardly and thereby force the vacuum cup head 131 downwardly to cause the vacuum cups to engage the containers. Simultaneously with this engagement, the vacuum is applied so that, when the head is raised, the containers may be raised therewith.

The carriage 124 is provided with an arm 145 pivoted at 146. This arm is provided with a roller 147 which engages a cam rail 148. This cam rail, at its outward end, is provided with a downwardly extending pocket 149 in which the cam roller 147 moves during movement of the carriage. The lever 145 is connected to the oscillatable shaft 135 which supports the head, by means of a link 150, and an arm 151 on the shaft. By means of this arrangement, when the cam shaft rotates and the arm 126 is moved to the dotted line position shown in Fig. 19, the vacuum head 131 will be moved through an arcuate path into axial alignment with the case to be loaded.

The movement of the vacuum cup head during one revolution of the cam shaft is as follows.

The normal position of the head is shown in Fig. 18, and, as soon as the cam shaft starts to rotate, the head moves downwardly to cause the vacuum cups to engage the containers, and is then released by the raising of the lever 143 and the cups lift the containers from the conveyor. The head then moves in an arcuate path into axial alignment with the case and is then inserted in the case by a longitudinal movement.

Before the containers are moved into alignment with the case, the lower flap 152 of the case is moved downwardly by means of an arm 153 pivoted at 154. This arm is connected by means of a link 155 to an arm 156 having a roller 157 thereon. This roller engages a cam 158 (Fig. 18), so that, as the containers are raised, the flap 152 is moved out of the arcuate path of the containers. The arm 153 is returned to its normal position by means of spring 159.

Figure 21:
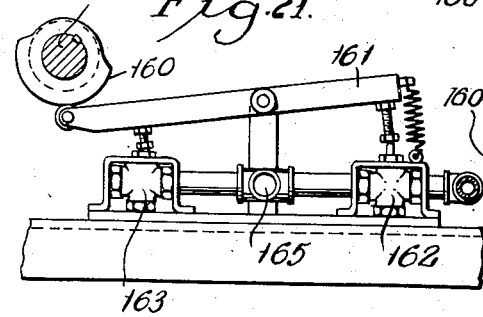
Fig. 21 is a side elevation of the valve mechanism for controlling the vacuum for operating the case opening cups and the container loader cups.
Figure 22:
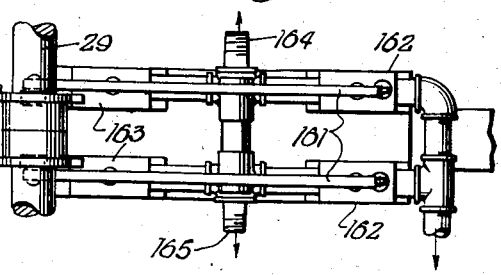
Fig. 22 is a top plan view of the embodiment illustrated in Fig. 21.

Figs. 21 and 22 illustrate a valve mechanism for controlling the application of vacuum to the various cups. This mechanism comprises cams 160 on the main cam shaft and these cams control levers 161 to open and close inlet valves 162 and exhaust valves 163. A conduit 164 leads to the case opening cups and a second conduit 165 leads to the container cups. It will be apparent that these cams and levers may be timed to open and close the valve as desired to control the operation of the cups.

In the present embodiment, a single group of containers completely fills the cases, and, as soon as they are filled, the filled cases are discharged from the machine by the same movement of the case conveyor which moves the collapsed cases to the loading stations. During the discharge of the cases from the machine, the forward flap on one end of the case is closed by a shoe 166, and substantially simultaneously the rear flap is closed by an arm 167 on a vertical shaft 168. This shaft 168 is operated by means of a cam 169 driven by the transverse conveyor shaft 7, to which it is connected by a suitable gear train. The cam is in engagement with a roller 170 on a pivoted lever 171 to which the arm 167 is connected by means of a link 172. The top and bottom flaps are folded in by means of the curved shoes 173.

The filled cases are moved outwardly onto a tilting table 174 which is provided with rollers 175 to support the cases. When both cases are completely on the table, the table is tilted by suitable means to turn the cases 45° and deposit them on a suitable conveyor where they may be conveyed to a sealing machine, or otherwise disposed of.

It will be apparent that modifications may be made without departing from the spirit of the invention, and it is, therefore, desired that the invention should be limited only by the prior art and the scope of the appended claims.

Having thus described this invention, what is claimed and desired to be secured by Letters Patent is:

1. A case loader comprising means for moving collapsed cases to a loading station, and means for squaring out said cases at said loading station, said squaring out means comprising vacuum cup means arranged to engage the bottom wall of said case and travel therewith toward said loading station, and a vertically movable vacuum cup means arranged to engage the top wall of each of said collapsed cases and to move said top wall substantially vertically at said station while the bottom wall is moved horizontally to completely square out the case.

2. A case loader comprising means for moving collapsed cases to a loading station, and means for squaring out said cases at said loading station, said squaring out means comprising vacuum cup means arranged to engage the bottom wall of said case and travel therewith toward said loading station, and a vertically movable vacuum cup means arranged to engage the top wall of each of said collapsed cases and to move said top wall substantially vertically at said station and at a substantially uniformly accelerated rate while the bottom wall is moved horizontally at a substantially constant speed to completely square out the case.

3. In a machine of the character described having a case loading station and means for loading containers into squared out cases at said loading station, the combination of a conveyor for moving collapsed cases, a squaring out mechanism associated with said conveyor, said squaring out mechanism comprising a vacuum cup for engaging the bottom wall of a case and movable with said case to prevent displacement of said wall relative to said conveyor, and a second vacuum cup positioned above said conveyor and arranged to engage the top wall of said case, said second cup being movable vertically to raise said top wall in the axial plane of said loading station while the lower wall of said case moves transversely of said plane to square out said case in loading position.

4. In a machine of the character described having a case loading station and means for loading containers into squared out cases at said loading station, the combination of a conveyor for moving collapsed cases, a squaring out mechanism associated with said conveyor, said squaring out mechanism comprising a vacuum cup for engaging the bottom wall of a case and movable with said case to prevent displacement of said wall relative to said conveyor, means cooperating between said cup and said conveyor to prevent side strain on said cup during movement and releasable when said case is squared out to enable return of said cup to normal position, a second vacuum cup positioned above said conveyor and arranged to engage the top wall of said case, said second cup being movable vertically to raise said top wall in the axial plane of said loading station while the lower wall of said case moves transversely of said plane to square out said case in loading position.

5. In a machine of the character described, having a magazine for holding a stock of collapsed cases, a conveyor for moving consecutive cases from said magazine to a loading station, means for squaring out a case at the loading station, a longitudinal track under said conveyor, a vacuum cup slidably mounted on said track, and normally positioned between said magazine and said loading station, means tending to retain said cup in its normal position and tending to return it to said normal position when it is moved therefrom, means to raise said track and cup thereon to cause the engagement of said cup with the bottom wall of a moving collapsed case to prevent displacement of said wall relative to said conveyor, means cooperating between said cup and said conveyor when said cup is engaged to cause forward pressure on said cup and prevent tilting thereof and consequent release from said case, means to relieve the vacuum in said cup when said case is squared out in the loading position, means to lower said track to release said cup from said conveyor, and means to return said cup to its normal position.

6. A case loader comprising means for moving collapsed cases to a loading station, and means for squaring out said cases at said loading station, said squaring out means comprising vacuum cup means arranged to engage the bottom wall of said case and travel therewith toward said loading station, a vertically movable vacuum cup means arranged to engage the top wall of each of said collapsed cases and to move said top wall substantially vertically at said station while the bottom wall is moved horizontally to completely square out the case, and aligning means to engage opposite walls of each squared out case.

7. A case loader comprising means for moving collapsed cases to a loading station, and means for squaring out said cases at said loading station, said squaring out means comprising vacuum cup means arranged to engage the bottom wall of said case and travel therewith toward said loading station, a vertically movable vacuum cup means arranged to engage the top wall of each of said collapsed cases and to move said top wall substantially vertically at said station while the bottom wall is moved horizontally to completely square out the case, positive aligning means adapted to engage the upper rear wall of each squared out case, and impositive aligning means adapted to engage the front wall to permit forward movement of said case from said station.

8. In a machine of the character described having a loading station and means for loading containers into squared out cases at said loading station, the combination of a first conveyor for moving collapsed cases, a squaring out mechanism associated with said conveyor, said squaring out mechanism comprising a vacuum cup for engaging the bottom wall of a case and movable with said case to prevent displacement of said wall relative to said conveyor, a second vacuum cup positioned above said conveyor and arranged to engage the top wall of said case, said second cup being movable vertically to raise said top wall in the axial plane of said loading station while the lower wall of said case moves transversely of said plane to square out said case in loading position, a second conveyor above said first conveyor and operable in synchronism therewith and having a flight thereon arranged to engage the rear wall of said case to maintain the squared out alignment, and an impositive means for substantially simultaneously engaging the front wall.

9. A case loader comprising a conveyor for moving collapsed cases to a loading station, means for squaring out said cases at said loading station, said squaring out means comprising a retaining means to engage the bottom wall of each collapsed case and retain it in horizontal alignment in its movement to said loading station, and a vertically movable means arranged to engage the top wall of each collapsed case and move said top wall substantially vertically at said station while the bottom wall is moved horizontally to completely square out said case.

JOHN L. FERGUSON.